United States Patent Office 3,426,831
Patented Feb. 11, 1969

3,426,831
METHOD OF FORMING A SAND CORE
Janis Robins, St. Paul, and Robert J. Schafer, Edina, Minn., assignors to Ashland Oil & Refining Company, Ashland, Ky., a corporation of Kentucky
No Drawing. Filed June 8, 1966, Ser. No. 555,951
U.S. Cl. 164—43                     3 Claims
Int. Cl. B22c 1/22; B28b 7/28; C08f 21/04

ABSTRACT OF THE DISCLOSURE

Foundry cores and/or molds capable of curing at room temperature to give cores and/or molds of excellent strength are obtained by mixing foundry sand with a binder comprising two packages, the first package comprising polyisocyanate and the second package comprising oil-modified alkyd resin, said second package containing linseed oil as a replacement for solvent normally required. By replacing solvent with linseed oil defects in the cores and/or molds such as scabbing, erosion and pinholing are substantially eliminated.

---

The present invention relates to an improved process of preparing cores or molds for use in making metal castings wherein the improvement resides in the use of an improved core binder. In another aspect, the present invention relates to the improved core binder.

In the foundry art, cores and molds for use in making metal castings are usually prepared from mixtures of sand with a binding amount of a polymerizable or curable organic binder. Such mixtures are referred to herein as "foundry mixes." The amount of binder used is typically from 0.5 to 5% based on the weight of the sand. Frequently, minor amounts of other materials are also included in foundry mixes, e.g. iron oxide, ground flax fibers, and the like. The binder permits a foundry mix to be molded or shaped into the desired form, usually in a pattern box or mold, and thereafter cured to form a self-supporting structure (i.e. a sand core or mold).

In recent years, the foundry art has been provided with core binders containing polyisocyanates and suitable coreactants. See, for example, U.S. Ser. No. 447,513, filed Apr. 12, 1965. Certain binders of this general type (i.e. containing an isocyanate) have a number of outstanding advantages. One such advantage is their ability to effectively and rapidly form cured cores at room temperature without the use of gaseous catalysts. Optionally, cores prepared with such binders can be baked to accelerate the cure.

Although the use of natural drying oils in conjunction with polyisocyanates has been previously suggested for use as core binders, attention has been largely focused on the use of oil-modified alkyd resins in conjunction with polyisocyanates. When the latter binders are compared with binder compositions based on polyisocyanates and natural drying oils, the performance of the oil-modified alkyd resin binders is far superior. For example, the rate of curing at room temperature for cores prepared from isocyanate/alkyd resin binder systems in much greater than the corresponding rate of cure for sand cores prepared from isocyanate/natural drying oil binder systems. For these and other reasons, those involved in the development and commercialization of such isocyanate-based binder systems have focused their attention on the use of oil-modified alkyd resins as the preferred co-reactant with the polyisocyanate.

Typically, the polyisocyanate and oil-modified alkyd resin are sold, shipped, and stored in separated packages to avoid premature reaction between the components. Present commercial practices involve the preparation of one package containing the polyisocyanate, the preparation of another package containing an oil-modified alkyd resin and substantial amounts of solvent, and often the preparation of a third package which contains one or more catalysts used to accelerate the curing rate. Sometimes, the catalysts are included in the package containing the oil-modified alkyd resin. Optionally, various additives can be included in the various packages. For example, air-hardenable petroleum polymers are frequently included in the package containing the oil-modified alkyd resin.

When such preferred prior art isocyanate binder systems have been used to prepare sand cores for use in making very large metal castings, certain undesirable effects have been noted. These defects include a strong tendency to scab, as well as erosion and gas defects.

We have now discovered, and this discovery forms the basis for the present invention, that these deficiencies or defects can be materially reduced and sometimes eliminated entirely by altering the composition of the package containing the oil-modified alkyd resin.

According to our invention, solvent is eliminated from the package containing the oil-modified alkyd resin and linseed oil or its equivalent is used in its place. In the ordinary practice of our invention, this package will contain from 15-70% linseed oil based on the combined weight of oil-modified alkyd resin and linseed oil. More desirably, the amount of linseed oil present will be from 40-60% on the same basis. An especially useful mixture is one containing approximately equal amounts of linseed oil and oil-modified alkyd resin. If desired, this package can optionally contain other reactive materials such as petroleum polymers as well as various additives and catalysts. However, in a particularly preferred embodiment, this package will consist essentially of only the linseed oil and oil-modified alkyd resin.

The isocyanates

Typically, cyclic and acyclic polyisocyanates containing at least 2 isocyanate groups, e.g. from 2–5 isocyanate groups, are employed. If desired, mixtures of polyisocyanates can be employed. Less preferably, isocyanate prepolymers formed by reacting excess polyisocyanate with a polyhydric alcohol (e.g. a prepolymer of toluene diisocyanate and ethylene glycol) can be employed. Suitable polyisocyanates include the aliphatic polyisocyanates such as hexamethylene diisocyanate; alicyclic polyisocyanates such as 4,4¹-dicyclohexylmethane diisocyanate; and aromatic polyisocyanates such as 2,4- and 2,6-toluene diisocyanate, and diphenyl methane diisocyanate and the dimethyl derivative thereof. Further examples of suitable polyisocyanates are 1,5-naphthalene diisocyanate; triphenyl methane triisocyanate; xylylene diisocyanate and the methyl derivative thereof; polymethylene polyphenyl isocyanate; chlorophenylene-2,4-diisocyanate, and the like.

All polyisocyanates do not serve with the same effectiveness. While the aforementioned polyisocyanates are, to a greater or lesser degree, effective in practicing the present invention, there are significant advantages associated with the use of cyclic polyisocyanates, especially the aromatic polyisocyanates, as contrasted to the aliphatic polyisocyanates. In general, aromatic polyisocyanates impart more rigidity to cores than do the aliphatic polyisocyanates. Polymethylene polyphenyl isocyanate, diphenylmethane diisocyanate, triphenylmethane triisocyanate, and mixtures thereof are preferred because of their high degree of reactivity, desirable core forming properties and low vapor pressure. The latter minimizes any possible toxicity problems.

The oil-modified alkyd resins

In general, it is preferred to employ oil-modified alkyd resins which have been prepared by reacting the following three classes of ingredients:

(a) Polyhydric alcohols having at least three hydroxyl groups, e.g. glycerol, pentaerythritol, trimethylol propane and the like. Pentaerythritol is preferred. Mixtures of such polyhydric alcohols can be used. While glycols can be used, better results are obtained if such glycols are used in conjunction with the polyhydric alcohols (use a mixture of ethylene glycol and pentaerythritol). Ordinarily, only the polyhydric alcohols will be used.

(b) Polycarboxylic acids (or their anhydrides) such as maleic acid, fumaric acid, phthalic acid, phthalic anhydride, isophthalic acid, chlorendic acid and the like. The various phthalic acids (particularly isophthalic acid and phthalic anhydride) are preferred. Mixtures of acids can be used.

(c) Oil such as soybean oil, linseed oil, cottonseed oil, castor and dehydrated castor oils, tall oil, tung oil, fish oil and the like. Mixtures of oils can be used. Desirably, the oil will be composed, in part at least, of a natural drying oil as opposed to the semi-drying or non-drying oils. Linseed oil is preferred.

The more preferred oil-modified alkyd resins will contain at least 40 weight percent oil (based on the total weight of the three alkyd resin-forming ingredients). More desirably, the alkyd resins will contain at least 50 weight percent oil on the same basis (i.e. a "long oil alkyd"). It should be pointed out that oil-modified alkyd resins can also be prepared (as in known in the resin art) from fatty acids rather than the corresponding oils or glycerides.

The hydroxyl value of the oil-modified alkyd resins should be at least 25 and preferably above 50. The upper limit of hydroxyl value is only limited by practical considerations, e.g. viscosity and desired degree of functionality. For most ordinary applications, oil-modified alkyd resins having hydroxyl values of from 50–250, e.g. 60–150, are desirable.

Use of the isocyanate binder

The binder system of the present invention can optionally be used in combination with other known binder systems. Also, the foundry mixes of this invention can optionally include other ingredients such as iron oxide, ground flax fibers, wood cereal, pitch, etc.

Catalysts are optionally and desirably used in conjunction with isocyanate core binders. The catalysts which are usually employed are those which accelerate the air oxidation or hardening of the oil-modified alkyd resin, those which accelerate the reaction between the polyisocyanate and the oil-modified alkyd resin, and those which do both. The amount of catalyst employed will be a catalytic amount, with the total amount of catalyst(s) usually ranging from 0.01–20%, based on the combined weight of the polyisocyanate and oil-modified alkyd resin. More frequently, from 0.1–15%, e.g. 0.25–10% catalyst will be used, on the same basis. The choice of catalyst and the amount thereof will affect the curing rate of the system. Metal naphthenates (e.g. cobalt naphthenate) are effective catalysts for both the isocyanate/hydroxyl reaction and the air oxidation of the hydroxyl-containing alkyd resin, the latter being their primary function. Sodium perborate can also be used to promote the oxygen cross-linking of the oil-modified alkyd resin. Metal ion catalysts such as tetra(hydro-carbyl) tin catalysts are especially desired. Particularly preferred catalysts are the dibutyl tin di(hydro-carbyl) catalysts. Dibutyl tin dilaurate is a very effective catalyst.

When combining the isocyanate and oil-modified alkyd resin with sand at or about the time a sand core is to be made, it is common to use from 5–150 parts by weight of polyisocyanate per 100 parts of the combined weight of alkyd resin and linseed oil. More frequently, from 5–90 parts, e.g. from 8–50 parts of polyisocyanate will be used on the same basis. With our preferred embodiment it is common to use from 10–40 parts, e.g. 15–30 parts of polyisocyanate on the same basis.

The total amount of binder employed (i.e. the total weight of isocyanate plus alkyd resin plus linseed oil), based on the weight of sand, will be a binding amount of up to 10%. Generally, the amount of binder (on the same basis) will be from 0.5 to 5 weight percent, e.g. 1–3 weight percent.

In mixing the alkyd resin, isocyanate, and catalyst with sand, it is advantageous to first mix the alkyd resin with the sand (and other optional ingredients), then add the catalyst with mixing, and finally add the polyisocyanate. The resulting mix will typically remain workable or plastic at room temperature for from 20–100 minutes. Other variations of this procedure are known and, under certain conditions, the catalyst can be omitted. However, catalysts are commonly and generally employed.

This mixture is then molded or shaped into the desired form, usually in a pattern box or mold, and thereafter cured to form a sand core. Depending upon the nature of the alkyd resin, polyisocyanate, and catalyst, this curing will be accomplished by simply allowing the binder to react at room temperature or by baking, or a combination of both techniques.

The present invention will be further understood by reference to the following specific examples which include a preferred embodiment. Unless otherwise indicated, all parts and percentages are by weight.

Example I

As a basis for comparison, a horn core and jacket for a large volute casting (weighing about 2900 pounds) for a compressor were prepared using a commercially available isocyanate core binder (i.e. Lino-Cure, a product of the Archer Daniels Midland Co.). This core binder consisted of three parts or packages. The first part was a mixture of 47 parts of oil-modified alkyd resin, 29 parts of a petroleum polymer, and 24 parts of solvent (mineral spirits).

The oil-modified alkyd resin was prepared by reacting approximately 64 parts of linseed oil, 15 parts of pentaerythritol, and 21 parts of isophthalic acid. The hydroxyl number of the alkyd was approximately 105. The second part or package contained a mixture of cobalt naphthenate and dibutyl tin dilaurate (i.e. catalysts). The third package contained aromatic polyisocyanate (diphenylmethane diisocyanate). The core and jacket were prepared by following the manufacture's instructions for this core binder. A casting made with this sand core and jacket exhibited considerable cope scabbing, erosion, and gas defects.

Using the results just noted as a basis for comparison, the procedure was repeated with the sole exception that the package containing solvent, alkyd resin and petroleum polymer was replaced with an equal amount (by weight) of a 50–50 mixture of the same alkyd resin and linseed oil. The result of making only this change in the procedure was the essential elimination of the casting defects previously noted with the solvent-based system.

Example II

The procedure of Example I was followed exactly to prepare cores for use in making boom-foot castings (weighing approximately 400 pounds) for a derrick. With the exception of two 2-inch diameter prints (one on the cope and one on the drag surface), the core was completely enclosed by molten metal during casting.

When the cores were made with the solvent-containing binder, the resulting castings exhibited a high incidence of scabbing.

When the package containing solvent, alkyd resin and petroleum polymer was replaced with an equal amount (by weight) of a 50–50 mixture of the same alkyd resin and linseed oil, castings made with such cores had very smooth surfaces and exhibited no evidence of scabbing.

Example III

An additional advantage of the use of solvent-free blends of oil-modified alkyd resin and linseed oil is the increase in tensile strength of sand cores cured at low temperatures which accompanies the use of such blends. In Table I, which follows, conventional dog-bone tensile specimens were prepared from mixtures containing 100 parts of Lake sand, 1.6 parts of the package containing the oil-modified alkyd resin, 0.2 part of the package containing catalyst and approximately 15–20% of polyisocyanate based on the weight of the package containing the oil-modified alkyd resin. The catalyst employed was a mixture of cobalt naphthenate and dibutyl tin dilaurate. The polyisocyanate was a commercially available form of diphenylmethane diisocyanate (Mondur MR). The binder system used as the basis of comparison was the same commercially available system used in Examples I and II.

TABLE I

| Contents of package containing the oil-modified alkyd resin | Tensile strength (p.s.i.), specimens cured for 20 hours at— | | |
|---|---|---|---|
| | 35° F. | 75° F. | 125° F. |
| (a) 47% alkyd of Example I, 29% petroleum polymer, 24% solvent (mineral spirits) | 180 | 270 | 295 |
| (b) 50% alkyd of Example I, 50% linseed oil | 300 | 330 | 450 |

As can be noted, the data in Table I show that the tensile strengths of cores prepared according to the practice of the present invention are consistently higher than the tensile strengths of cores prepared according to a preferred embodiment of the prior art. Note especially the high tensile strengths obtained with cores cured at the very low temperature of 35° F.

Example IV

Standard specimens for determining collapsibility or compressive strength at high temperatures were prepared from foundry mixes prepared in accordance with Example III. These specimens were cylindrical, being 2 inches long and having a circular cross-sectional area of one (1) square inch. These specimens were placed in a furnace pre-heated to 2500° F. and a load of 25 pounds immediately applied between the opposing one square inch ends of the specimens. The average results obtained in this test are shown in Table II which follows.

TABLE II

Contents of package containing the oil-modified alkyd resin:

| | Time (seconds) before sample collapsed |
|---|---|
| (a) 47% alkyd of Example I 29% petroleum polymer 24% solvent (mineral spirits) | 20 |
| (b) 50% alkyd 50% linseed oil | 200 |

Having described the present invention with a certain degree of particularity, it will be realized that certain changes and variations falling within the spirit and scope of this invention will become obvious to those skilled in the art. It is not intended that this invention be limited to any of the materials which have been specifically mentioned for the sake of illustration, nor by the specific proportions which have been given for the sake of illustration.

What is claimed is:

1. A foundry process which comprises: (1) mixing sand with a binding amount of up to 10% by weight based on the weight of said sand of a no-bake binder to thereby form a foundry mix, said no-bake binder comprising:
  (a) a first package containing a polyisocyanate, and
  (b) a second package containing an oil-modified alkyl resin and linseed oil, (2) shaping said mixed sand, and (3) thereafter curing said shaped sand to thereby form a sand core.

2. The process of claim 1 wherein said second package contains only linseed oil and said oil-modified alkyl resin.

3. The process of claim 2 wherein:
  (a) said polyisocyanate comprises diphenylmethane diisocyanate;
  (b) wherein said catalyst is a mixture of cobalt naphthenate and dibutyl tin dilaurate; and
  (c) wherein from 8–50 parts by weight of polyisocyanate are present per 100 parts of the combined weight of oil-modified alkyd resin and linseed oil.

References Cited

UNITED STATES PATENTS

| | | | |
|---|---|---|---|
| 1,831,555 | 11/1931 | Earl | 164—43 X |
| 2,963,456 | 12/1960 | Betts et al. | 164—43 X |
| 3,227,564 | 1/1966 | Standen | 164—43 X |
| 3,255,500 | 6/1966 | Engel et al. | 164—43 |
| 2,282,827 | 5/1942 | Rothrock | 260—22 |
| 3,012,987 | 12/1961 | Ansul | 260—18 |
| 3,177,167 | 4/1965 | Skreckoski et al. | 260—18 |
| 3,318,828 | 5/1967 | Seiner | 260—18 |
| 3,332,896 | 7/1967 | Burns et al. | 260—18 |

FOREIGN PATENTS 884,153  12/1961  Great Britain.

J. SPENCER OVERHOLSER, *Primary Examiner.*

EUGENE MAR, *Assistant Examiner.*

U.S. Cl. X.R.

106—38.6; 260—18, 22